United States Patent [19]

Peters

[11] Patent Number: 5,391,387
[45] Date of Patent: Feb. 21, 1995

[54] PROCESS AND APPARATUS FOR MANUFACTURING SHAPED CONFECTIONERY PRODUCTS

[75] Inventor: Michael D. Peters, Gloucestershire, England

[73] Assignee: A.C. Machines Limited, Ireland

[21] Appl. No.: 941,434

[22] PCT Filed: Apr. 15, 1992

[86] PCT No.: PCT/GB92/00697
  § 371 Date: Oct. 23, 1992
  § 102(e) Date: Oct. 23, 1992

[87] PCT Pub. No.: WO93/20705
  PCT Pub. Date: Oct. 28, 1993

[51] Int. Cl.[6] .................. A23G 3/00; A23P 1/00
[52] U.S. Cl. .................. 426/512; 425/116; 425/134; 425/348 R; 425/361; 426/5; 426/514; 426/660
[58] Field of Search .............. 426/5, 104, 144, 279, 426/514, 572, 660, 512; 99/450.8; 425/116, 120, 121, 129.1, 134, 361, 348 R, 348 S

[56] References Cited

U.S. PATENT DOCUMENTS 2,657,144 10/1953 Batchlet .................. 426/5
3,316,154 4/1967 Sellers .................. 426/5
3,322,073 5/1967 McKown et al. .................. 99/450.8
3,821,423 6/1974 Jamin .................. 426/104

FOREIGN PATENT DOCUMENTS 2328407 5/1977 France .

Primary Examiner—George Yeung
Attorney, Agent, or Firm—Lerner, David, Littenberg, Krumholz & Mentlik

[57] ABSTRACT

Partially formed products (2) are placed in molds (8) and a fluid such as air or an edible filler is injected into the partially formed products (2), e.g. by needles 17[see FIG. 6], so as to cause expansion and thereby produce final products (2) having the shape of the molds (8). Each mold (8) may comprise an upper mold part (14) and a lower mold part (11). The lower mold parts (11) may be mounted on a chain conveyor (9, 9b, 9c) [see FIG. 1] or a rotating cylinder (28) [see FIG. 12] so that the partially formed products (2) are moved towards and the final products (2) are moved away from a reciprocating assembly (12, 13) which carries the upper mold parts (14). Preferably, the final products (2) are retained in the upper mold parts (14) and then ejected by a blast of air. The invention enables complicated shapes to be formed at high production rates while using an economical amount of chocolate or the like.

20 Claims, 10 Drawing Sheets

PROCESS AND APPARATUS FOR MANUFACTURING SHAPED CONFECTIONERY PRODUCTS

The present invention relates to a process for manufacturing confectionery and similar products shaped, at least on the external surface, according to a preselected design. The invention also relates to a machine for carrying out said process and to the shaped final products.

Confectionery products such as chewing gum and bubble gum products, soft candies, toffees etcetera, are mass-produced with very high outputs per hour. Methods to produce them in symmetrical shapes, such as spherical, cylindrical or ellipsoidal shapes, are known in the art. On the contrary it is not possible to obtain them with shapes reproducing fancy objects, nor is it possible to obtain such products with their surface shaped according to a selected design, i.e. with a plurality of shaped lines and areas formed in high- or bas-relief.

The aim of the present invention is to solve the above mentioned problem by providing a way of industrially producing shaped confectionery products with a high output per hour in a simple and economical way.

Another aim of the present invention is to provide an apparatus for carrying out the above referred to industrial process.

According to a first aspect of the present invention, there is provided a process for manufacturing confectionery products, comprising the steps of: producing an intermediate product which is plastically deformable and has a smaller size than a desired final product; positioning said intermediate product in a mold having a preselected shape; connecting an interior portion of said intermediate product to a source of pressurized fluid; feeding said pressurized fluid into said intermediate product interior portion to conform said intermediate product to said preselected shape of said mold to produce said final product; disconnecting said final product from said fluid source; and extracting said final product from said mold.

According to a second aspect of the present invention, there is provided a confectionery product molded to a preselected shape and having a plurality of molded areas and lines on its outer surface.

According to a third aspect of the present invention, there is provided apparatus for producing shaped confectionery products, comprising: a plurality of upper and lower mold parts; positioning means for positioning intermediate products in said mold parts; fluid feeding means for feeding pressurized fluid into an inner portion of each intermediate product to produce said shaped products; and extractor means for removing said shaped products from said mold parts.

Preferred features and embodiments of the present invention are described below with reference to the accompanying drawings, in which.

Figure 1:
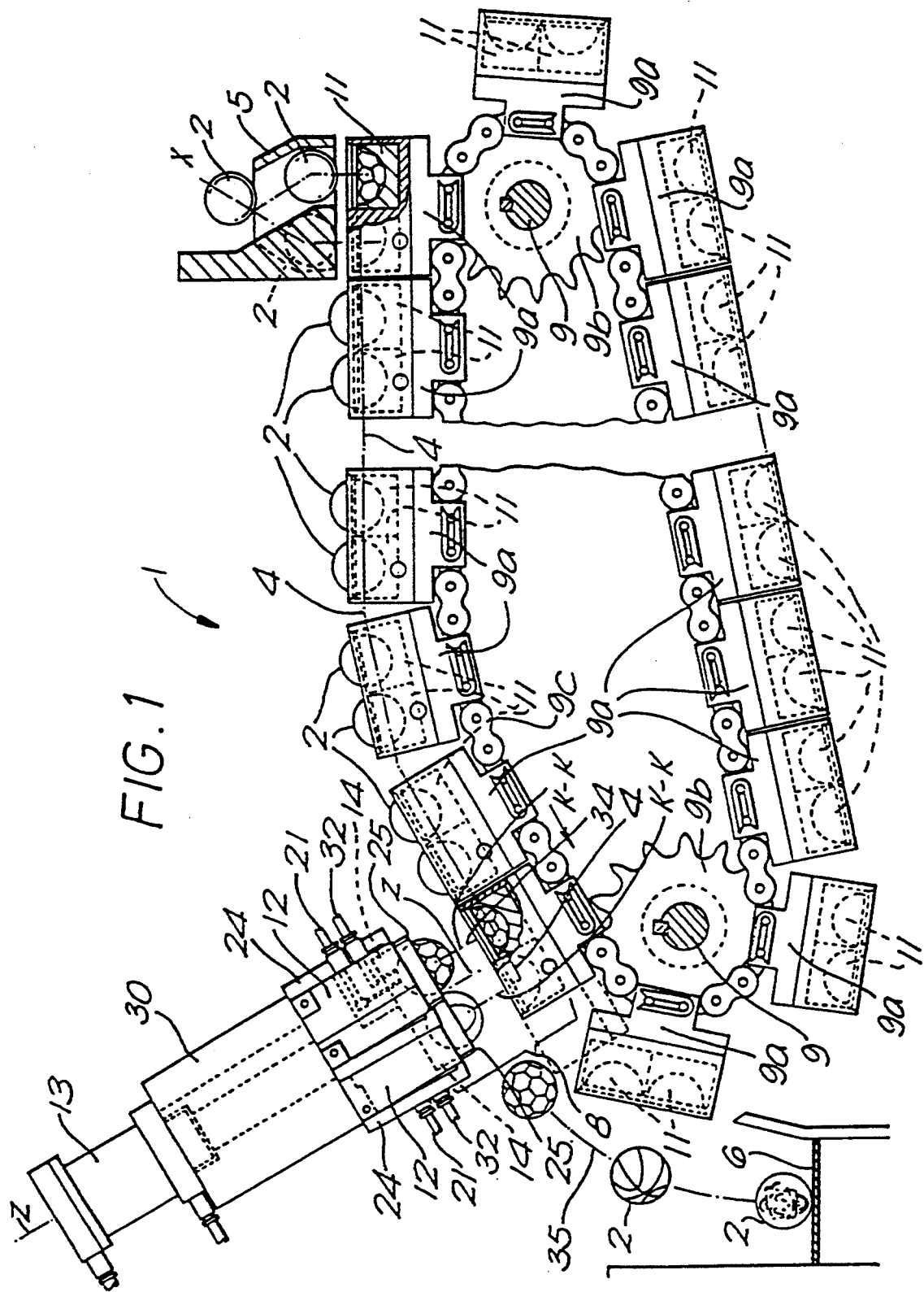
FIG. 1 is a side view, partially sectioned, of a preferred embodiment of an apparatus according to the invention.
Figure 2:
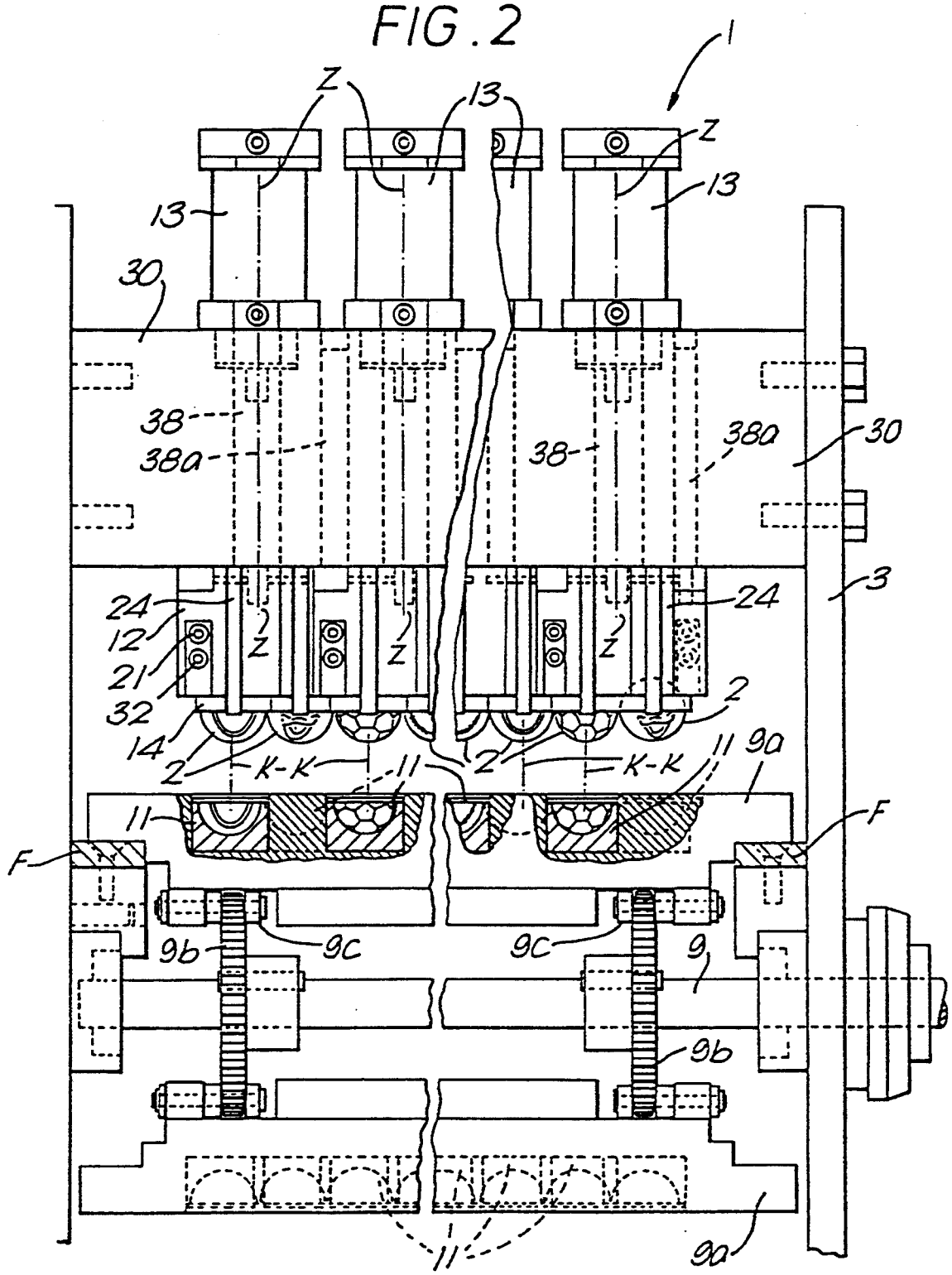
FIG. 2 is a front view, partially sectioned, of the apparatus of FIG. 1.

With reference to the accompanying drawings, reference 1 generally refers to an apparatus for the production of shaped candy products 2 reproducing a predetermined design.

Apparatus 1 comprises a plurality of lower half molds 11 and upper half molds 14, feeding means 5 for feeding intermediate products 2, i.e. the raw confectionery products to be shaped, to the lower half molds, and means 12 for temporarily closing together upper and lower molds 11 and 14. Moreover, apparatus 1 comprises fluid feeding means 16, 21 that are connectable to the interior portion of the intermediate products 2 and to a source of pressurized fluid (not shown), and extractor means for extracting the shaped product from the molds 11 or 14.

In the preferred embodiment disclosed in the drawings, the upper molds 14 are "fixed" i.e. they are reciprocatable along their vertical axis z—z but they cannot undergo any lateral traverse. The lower half molds 11 are movable from a first position corresponding to feeding means 5 to a second position where molds 14 are located, and viceversa, along a closed loop path 4.

According to the preferred embodiment disclosed in FIGS. 1-5, the lower molds 11 are housed within a plurality of supporting bars 9a parallel to each other and mounted on a chain conveyor 9, 9c, 9b that forms the closed path 4. As also disclosed in FIG. 2, the chain conveyor comprises a couple of shafts 9 rotatably mounted on a frame 3. The shafts 9 are coupled to sprocket wheels 9b, by means of which chains 9c are moved, together with bars 9a that are secured to the chain links. Frame 3 is also provided with low friction elements F (FIG. 2) supporting bars 9a at least at the shaping position.

Each bar 9a houses a plurality of half molds 11 offset to each other (FIG. 11) in order to have a pitch P corresponding to the intermediate product sorting pitch in the machines (not shown) producing products 2. These machines are known in the art and are not central to the present invention.

Frame 3 also rigidly supports element 30 which houses a plurality of reciprocatable saddles 12 or similar means carrying the upper half molds 14. Molds 14 are offset in the same way as lower molds 11, with the same pitch P (see FIG. 7), and are movable from a closing position, in which they cooperate with lower half molds 11 to form a closed mold, to an upper stop position.

The saddles 12 are supported so as to be slidable in direction z—z, and are reciprocated by the action of motor means such as a pneumatic cylinder 13. In order that the saddle 12 is moved axially in direction z—z without rotating about the axis z—z, both an operating shaft 38 and an "idle" shaft 38a are provided. However it is also possible to use a pneumatic cylinder with a non-rotating shaft.

Each lower half-mold 11 and upper half-mold 14 is internally shaped in a way that its inner surface reproduces the corresponding half of the object, so that, when juxtaposed, the closed mold 8 reproduces the shape of the whole object with high- and bas-relief areas and lines.

In the preferred embodiment herein disclosed, upper molds 14 are mounted onto saddles 12 together with the fluid feeding means 16, holding means for temporarily retaining the shaped products 2 in the molds 14, and extractor means for extracting the shaped products from the upper molds.

Figure 4:
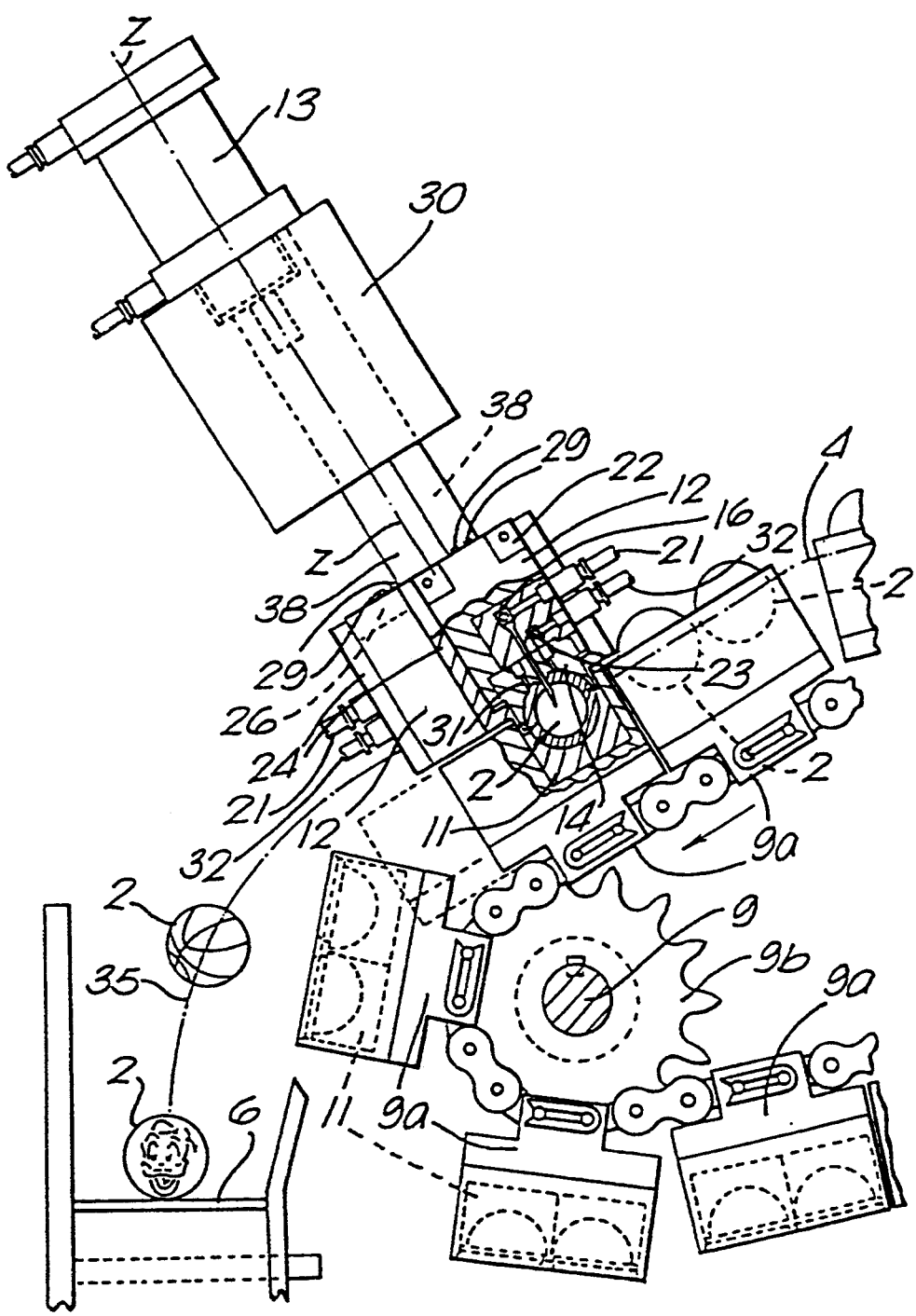
Figure 7:
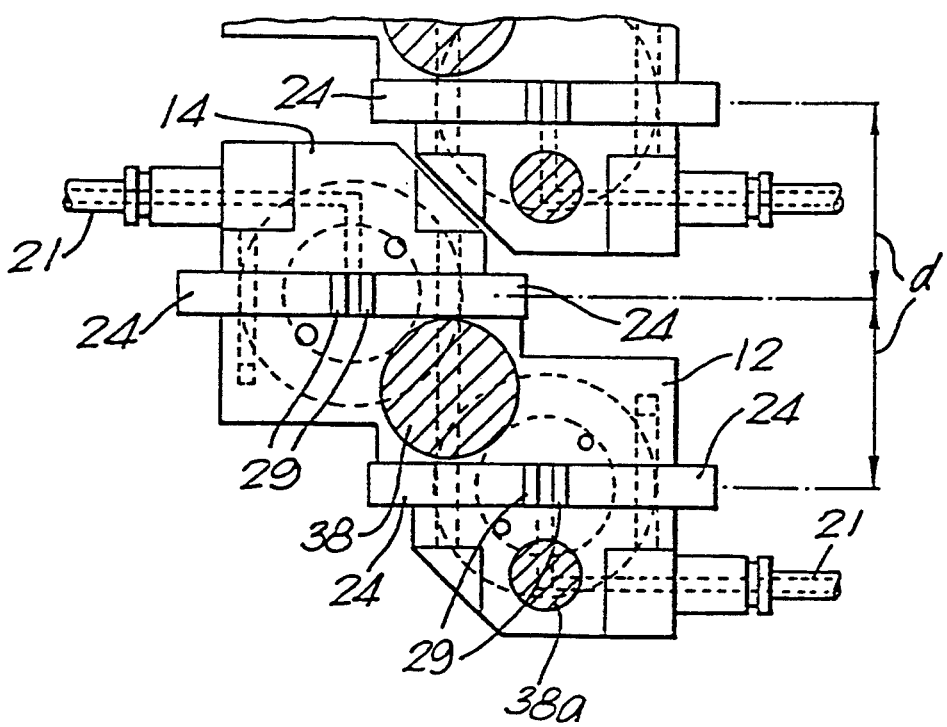
Figure 8:
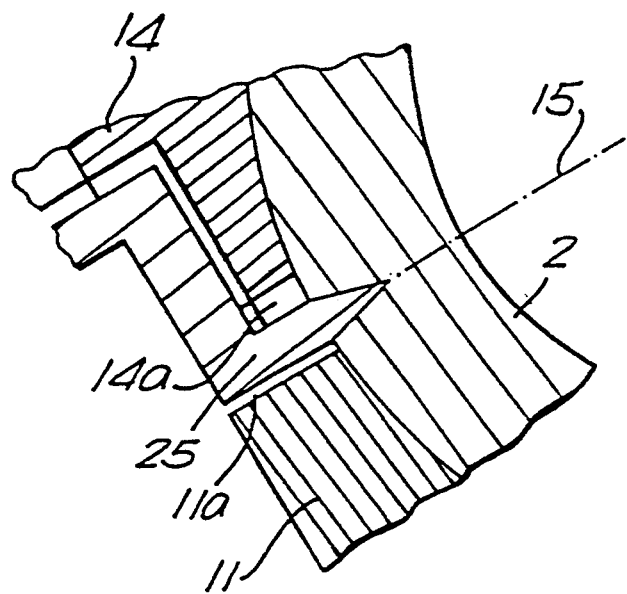
Figure 9:
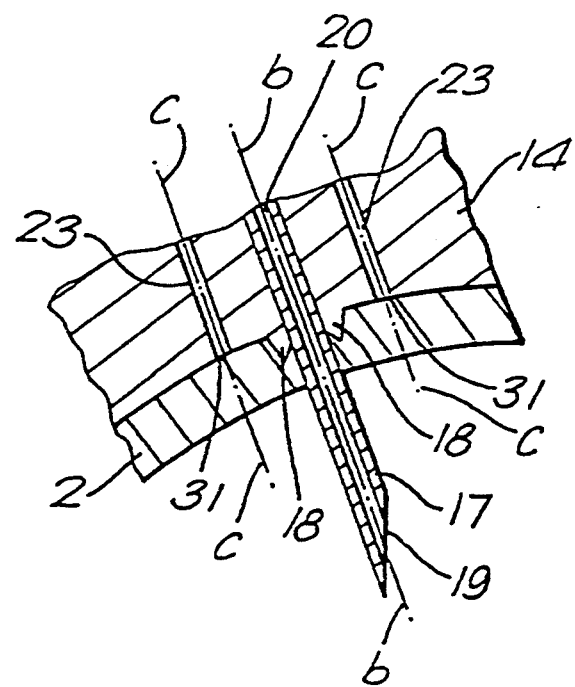

As disclosed in detail in FIGS. 6–9, the pressurized fluid feeding means comprises a hollow needle 17 fixed to the upper half-mold 14 and having axis b—b coinciding with axis k—k of the saddle 12 (FIG. 9). The needle 17 has a free end 18 with a tip 19, preferably oblique, which projects into the upper half-mold 14. The intermediate product 2 is preferably hollow: in this case the length of the projecting portion of the needle is greater than the thickness of the wall of the product 2 (FIGS. 4 and 9).

An opposite end 20 of the bored needle 17 is connected to a duct 21 which is in turn connectable to a source of pressurized fluid, known per se and not shown, suitable for delivering a fluid at a preset pressure. The pressurized fluid can be air or an edible filler, such as a sugar syrup or the like.

Adjacent the needle 17 is provided a collar 18 having a sharp edge facing into the half-mold 14 and projecting therein for a predetermined distance. The purpose of collar 18 is to seal the hole made by the needle 17.

The holding means 22 comprises two opposed arms 24, hinged to saddle 12, and having free pointed front ends 25 and rear ends 26.

The arms 24 are biased by elastic means, such as springs 27, which towards a closed position in which their free ends 25 project into the closed mold 8 at the interface 15 between the half-molds 11, 14 (FIG. 8). The free ends 25 project through notches 11a and 14a provided in the lower half-mold 11 and in the upper half-mold 14, respectively.

The rear ends 26 of arms 24 are provided with projecting portions 29 in order, upon their engagement by the fixed element 30 once the saddle 12 reaches its back stop position, to have the arms 24 open against the action of spring means 27 and thus release the shaped product. Extractor means comprises a plurality of blowing nozzles 31, located in the internal surface of the upper half-mold 14. The axes c—c of ducts 23 of the nozzles are parallel to the axis b—b of needle 17 and the nozzles are symmetrically positioned around the needle. This provides optimal extraction of the shaped product. The nozzles 31 are connectable through ducts 21 and 32 to a source of pressurized air (not shown).

In FIG. 7 is shown the preferred configuration of reciprocatable saddles 12. According to this embodiment, each saddle 12 carries two upper molds 14 offset from each other by the required pitch P. Each saddle has a transverse section that is substantially rectangular, with two opposite corner portions missing.

It is thus possible to position two adjacent saddles 12 very close together (see FIG. 7) and to maintain the required pitch P between molds mounted on adjacent saddles. The ducts 21 and 32 for each half-mold 14 are positioned above each other and the ducts for the two molds 14 of each saddle 12 are positioned on opposite side of the saddle.

Figure 10:
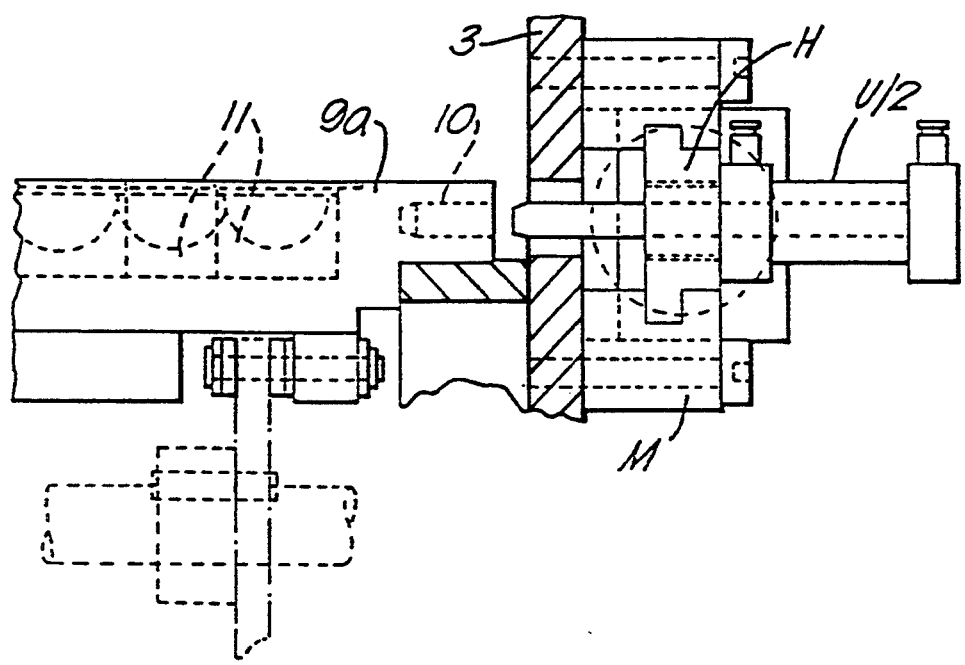
Figure 11:
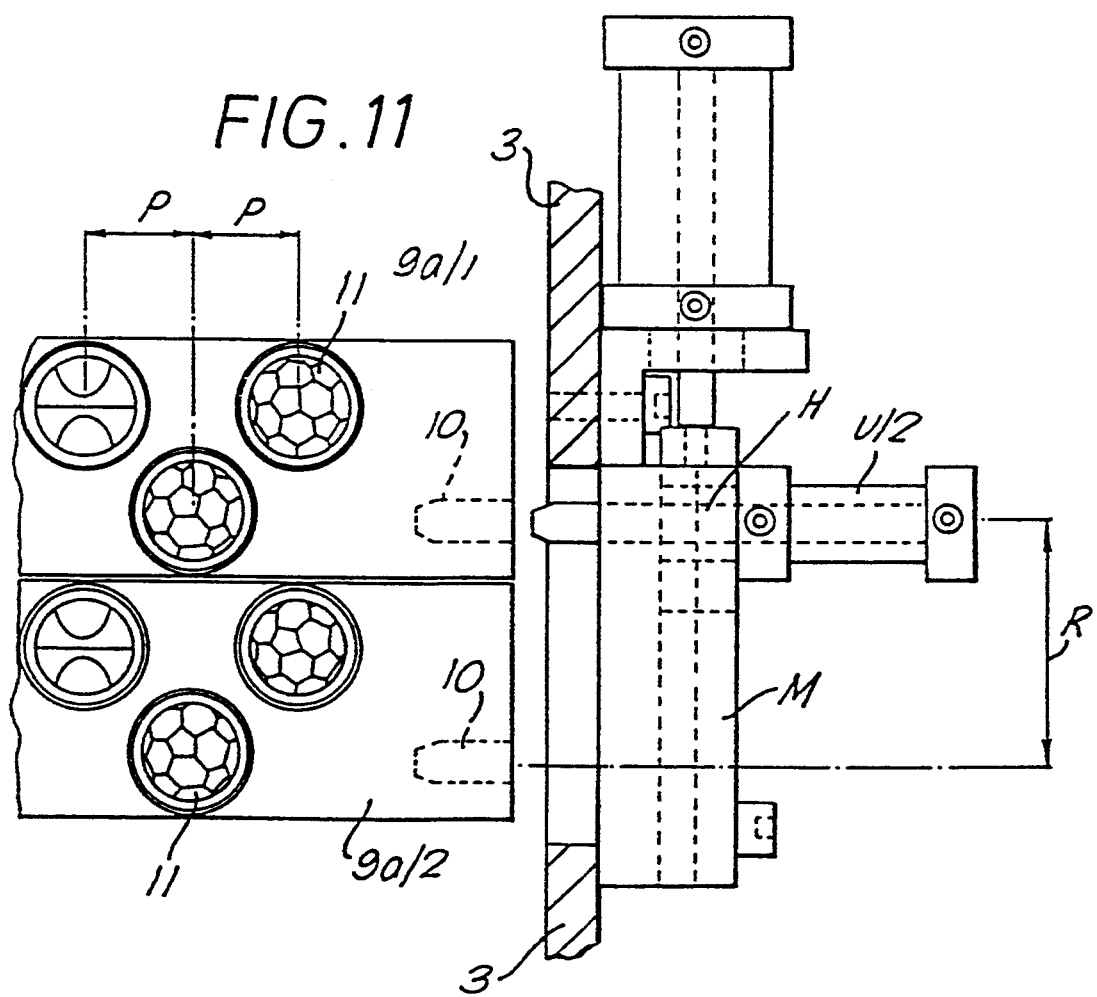

FIGS. 10 and 11 show a preferred embodiment for stepwise movement of the bars 2a along the chain conveyer. In this case, instead of known motors acting on one shaft 9, bars 9a are moved by means of a pneumatic piston directly acting on the bars 9a. More specifically each bar 9a is provided on each side adjacent to frame 3 with a hole 10. On the outside of frame 3 is provided piston U/2 pneumatically insertable and retractable into and from the hole 10.

Piston U/2 is mounted on slider H and is reciprocatable between two positions, along guiding ways M, by means of another pneumatic piston U/1.

With reference also to FIG. 1, piston U/2 and slider H are movable from position 9a/1 (i.e. the bar position immediately upstream of the molding position) to position 9a/2 (i.e. the molding position itself).

During operation, piston U/2 is first inserted into hole 10 of bar 9a located at position 9a/1. Then piston U/1 is actuated and the bar is moved from position 9a/1 to position 9a/2; the pitch R of this traverse can thus be perfectly controlled in order to obtain a correct alignment of lower half molds 11 and upper half molds 14 at position 9a/2.

Once molds 11 and 14 are aligned and joined to form mold 8, piston U/2 is retracted and moved back to position 9a/1 to which a new bar 9a has been traversed upon movement of the original bar to position 9a/2. The cycle is then repeated.

It should also be noted that, thanks to this embodiment, bars 9a and therefore the molding step can be operated at the same pace at which is operated the equipment producing the intermediate raw product.

The process according to the invention will now be described with reference to FIGS. 1 to 5.

The intermediate raw products 2 are produced in a known machine, upstream to the apparatus 1 of the present invention. By intermediate (raw) products are meant confectionery products that according to prior art are either suitable to be packed as finished products or have to undergo only some finishing steps, such as coating. In the following description reference will be made to spherical and hollow bubble-gums, but, as previously mentioned, the process applies also to non-spherical and non-hollow bubble-gums and other products such as toffees etc.

From this known machine (not shown) the products 2 are fed to feeding means having an inter-product pitch the same as that of the output row of the known machine. This means that if the known machine produces a row of, e.g., 32 raw products at 32 different output positions, the bars 9a will have 32 offset molds 11 with the same pitch as the output positions and products.

Feeding means 5 is a hopper having offset ducts 7 through which products 2 are fed to correspondingly offset lower molds 11 on bar 9a mounted on chain conveyor 9.

Figure 3:
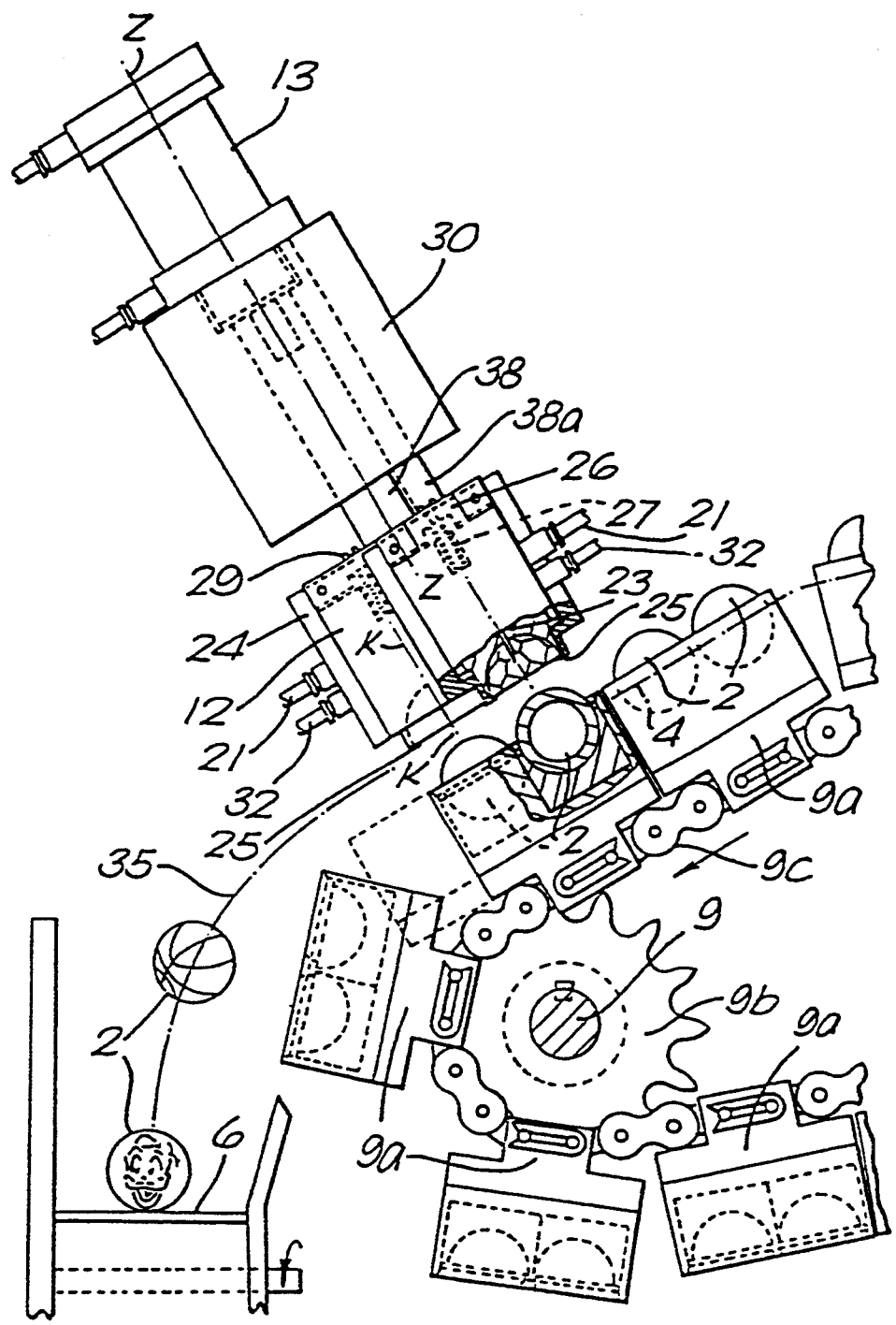
FIGS. 3 to 5 are enlarged side views, in partial section, of the apparatus of FIG. 1 and show sequential steps of the invention process.

The bar is then moved, by known means or by the device above disclosed with reference to FIGS. 10 and 11, to position 9a/2 (FIG. 3). Upper molds 14 are then lowered by saddles 12 onto lower half molds 14 (FIG. 4), thus forming a whole shaping mold 8, and needle 17 pierces product 2. At the same time, collar 18 slightly compresses the outer surface of product 2, providing a fluid-tight seal around needle 17.

Air, sugar syrup or another suitable pressurized fluid is then fed through needle 17 to the hollow interior of product 2. This expands the product and urges it against the inner surface of molds 11 and 14 and conforms its shape to the mold design. During this swelling step, product 2 is also urged against collar 18 and free pointed ends 25 of arms 24 (see FIG. 9).

In order to be expanded and molded, intermediate products 2 are in a plastically deformable condition. In the case of bubble gums, this condition is achieved by ensuring that the intermediate products 2 are hot enough when they exit from the upstream producing machine to be sufficiently deformable.

However, heating or cooling means may be provided upstream of feeding means 5 to optimize product 2 temperature.

At the end of this step, shaped product 2 is therefore secured by arms 24 to the upper half mold 14 and to saddle 12.

The fluid pressure required depends on the nature and kind of product (bubble gum, toffee etcetera). For the average bubble-gum product having a wall thickness within the range of 2 mm to 6 mm and an initial diameter of 23–24 mm and a final diameter of about 26 mm, the air pressure value is about 3.5–4.0 atm. The skilled man will easily determine the suitable pressure for each product after a few tests.

Figure 5:
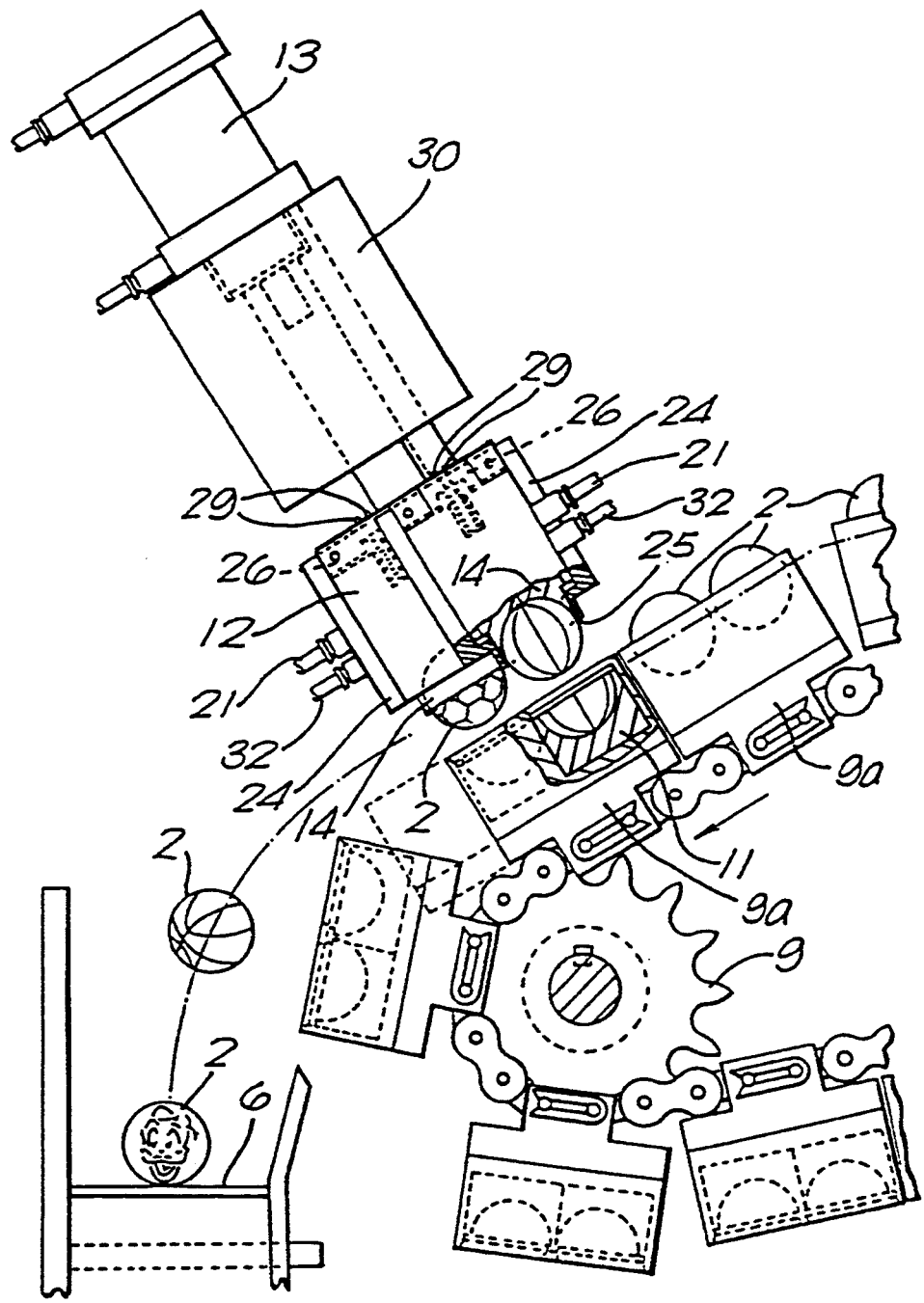
Figure 6:
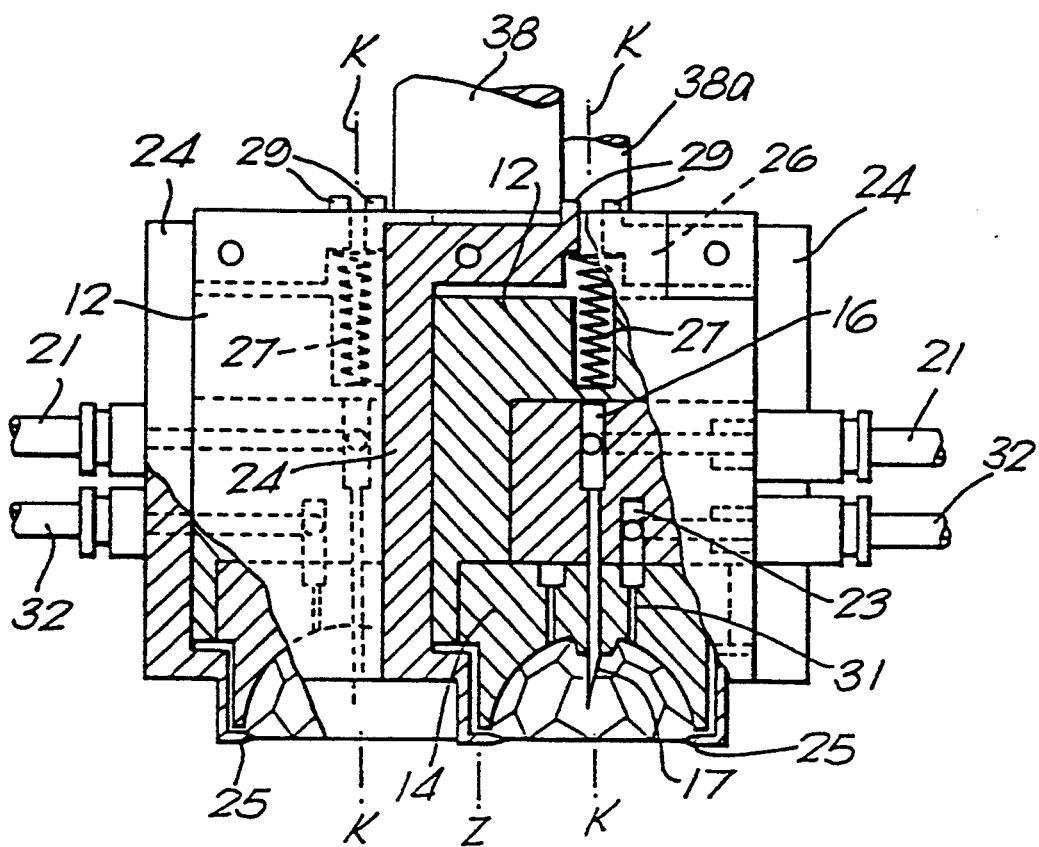
FIGS. 6 to 11 are side and top enlarged views, in partial section, of details of the apparatus according to the invention.

After the shaping step the pressurized fluid source is disconnected from needle 17, and saddles 12 are brought to their raised stop position (FIG. 5). Shaped products 2 are retained by arms 24 and follow path 34 (FIGS. 1 and 2) until saddle 12 reaches its upper stop. Then projecting portions 29 are pressed and arms 24 open to free the products 2.

Compressed air is then fed through ducts 32, 21 to nozzles 31 and shaped products 2 are extracted (ejected) from upper half molds 14 to fall onto conveyor 6 that brings them after cooling to wrapping and packaging equipment (not shown) or to coating apparatus (not shown). Where products 2 are bubble-gums, they preferably undergo a subsequent sugar coating step in a way known per se, still retaining their shaped appearance notwithstanding this coating step.

It should be noted that molds 11 plus bars 9a in positions 9a/1 and 9a/2, and molds 14 plus saddles 12, while having relevant axes perpendicular to each other, are inclined with respect to the plane of the first portion of path 4. Because of this inclination, after the molding and shaping step, when shaped products are released and extracted from upper molds 11, the relevant bar 9a will have moved from position 9a/2 to the position shown with dotted lines in FIG. 1: the released and ejected products will fall first on the thus moved bar and from it to conveyor 6 along path 35.

Dimensions of products 2 depend on dimensions of raw products and can vary within, e.g., 10 to 40 mm if the products are spherical, and within, e.g., 1 to 12 cm if the products are roughly cylindrical or elliptical. The shapes of the products may vary accordingly: football, basket, baseball or soccer balls, cartoon characters, corn, vegetables, fruits, etcetera.

Figure 12:
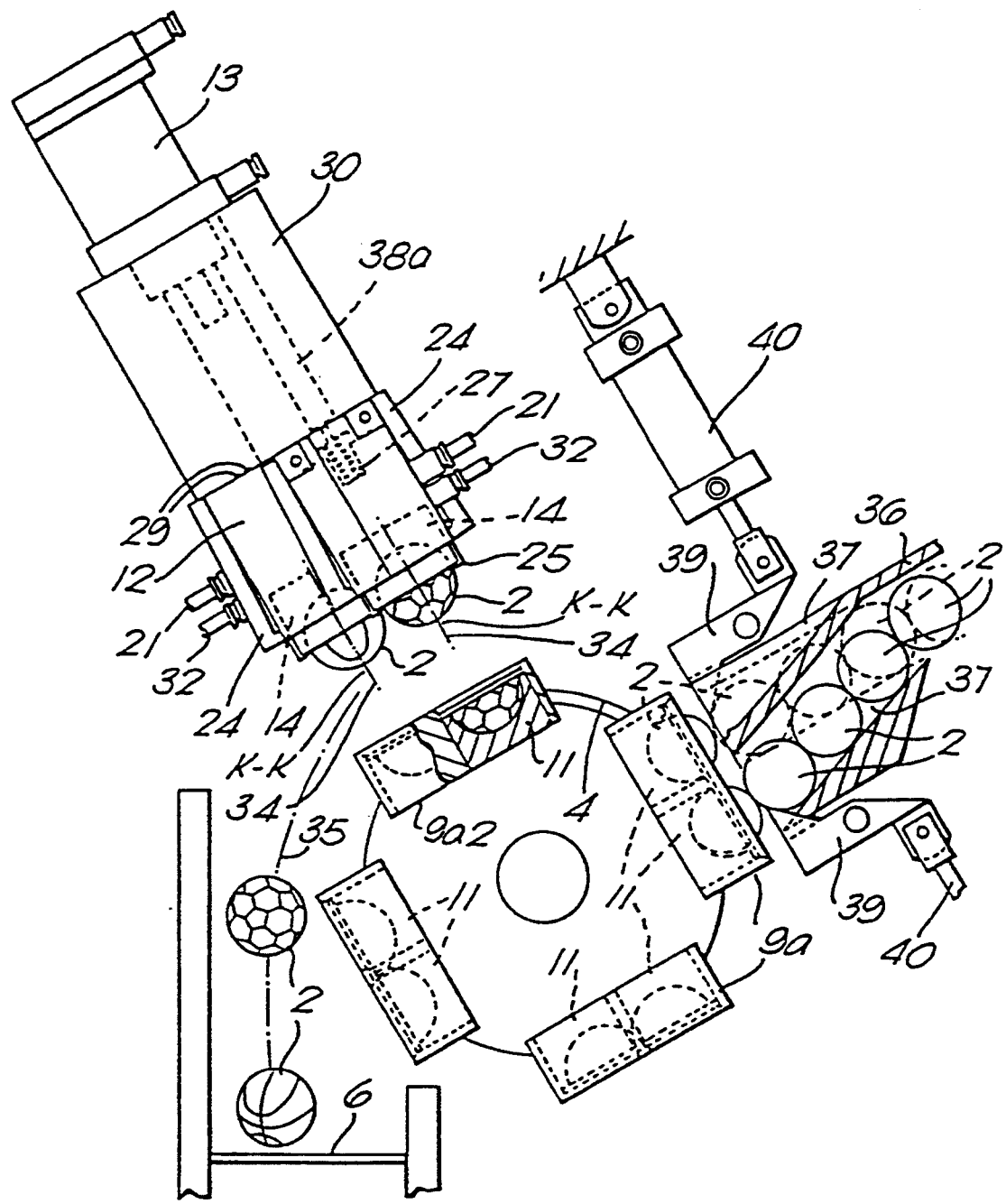
FIGS. 12 and 13 are partially sectioned side and front views, respectively, of a further embodiment of an apparatus according to the invention.
Figure 13:
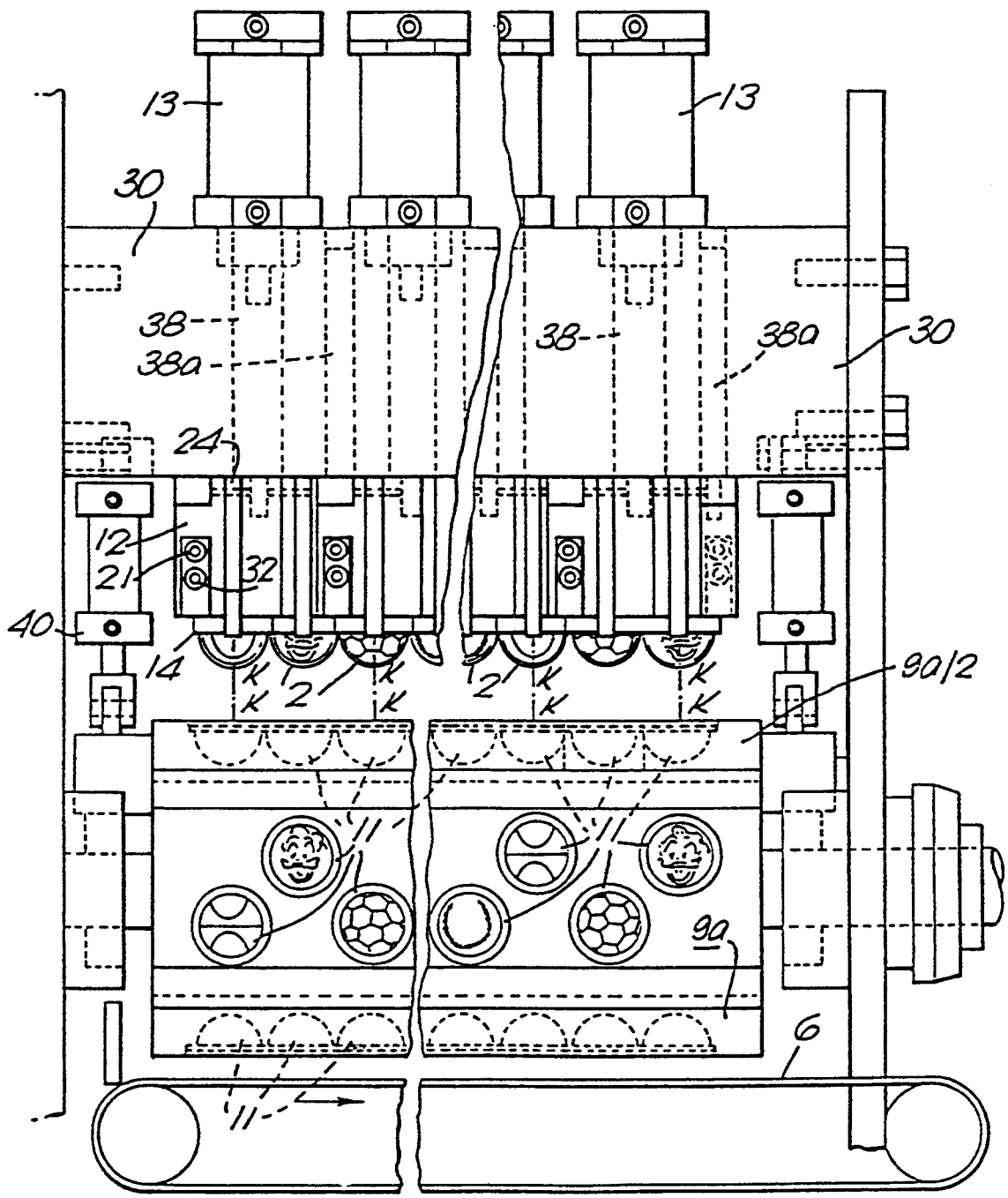

In FIGS. 12 and 13 is shown another possible embodiment according to the present invention.

In these figures the same references of previous FIGS. 1–11 are used for the same elements.

In this embodiment the basic principle is the same as before, but instead of chain conveyor 9 bars 9a are mounted on a rotating cylinder 28.

Besides this, the other main difference from previous embodiment resides in the means for feeding intermediate products to lower half molds 11. In this case (FIG. 12) raw products 2 are fed from the known producing machine (not shown) to a feeder 36 comprising a plurality of offset ducts 37, each aligned with the stop position of relevant mold 11. Feeder 36 further comprises two retaining arms 39, each cooperating with a plurality of the offset ducts 7 in order to retain raw products 2 while cylinder 28 is rotated from one position to the next one. In the preferred embodiment, arms 39 are hinged and pneumatically operated by pistons 40 at a preset rate to alternately block and unblock the ducts 7. An even better feeding of raw intermediates 2 is obtained by using a belt conveyor (not shown) upstream of feeder 36 to carry products 2 from the known producing machine. The belt conveyor will be movable in steps substantially equal to the diameter of product 2: products 2 will thus be fed to molds 11 by the combined action of gravity and movement of the belt conveyor.

From the above embodiments it is evident that the present invention provides several further advantageous features. In fact, by working at the same rate as the machine producing the intermediate products, it is possible to have a very high rate that results in a very high output, usually above 500 pieces per minute. Moreover, by using the same inter-product pitch as the output of the machine producing the intermediate products, space is saved.

A further advantageous feature is that the apparatus can be located at the end of a known machine producing the intermediate products without expensively modifying the known machine.

Another advantage is that molds 11, 14 and/or bars 9a can be easily removed from chain conveyor 9-9c or cylinder 28 in order to be replaced with different molds for differently shaped products.

A still further advantage is that bigger final products can be obtained, with the same weight as the intermediate products.

Last but not least, the final sugar coating step, if done, does not conceal the molded lines and areas on the product 2, but instead enhances them, especially if the coating colour is different from the product colour. In this case a coating process producing a thin coat will be used so as to coat only the high-relief areas.

In order to obtain this result the coating syrup is spread on the walls of the coating pans, and is not applied directly to the shaped products. Filling in of bas-relief lines and areas is thus avoided.

However, even if a thick coating is used, i.e. the bas-relief areas are coated in the same colour as the rest of the surface, the high- and bas-relief areas are still discernable and the shaped appearance is maintained. In fact, a greater amount of coating syrup will be deposited in bas-relief lines, thus giving a more intense colour to those lines compared with the high-relief areas.

I claim:

1. A process for manufacturing confectionery products, comprising the steps of:
    producing a plastically deformable intermediate product having an interior portion and a size smaller than a size of a final product;
    positioning said intermediate product within a mold having upper and lower parts of a preselected internal shape;
    connecting said interior portion of said intermediate product to a source of pressurized fluid;
    feeding said pressurized fluid into said interior portion to conform said intermediate product to said preselected internal shape of the upper and lower mold parts to produce said final product; and
    extracting said final product from said mold.

2. A process according to claim 1 wherein said intermediate product is positioned in said lower mold part at a first position and said lower mold part with said intermediate product is moved to a second position in the vicinity of said upper mold part.

3. A process according to claim 2, wherein said final product is temporarily secured to said upper mold part after being produced.

4. A process according to claim 2, wherein said lower mold part is moved between said first and second positions by a chain conveyor.

5. A process according to claim 2, wherein said lower mold part is moved between said first and second positions by a rotating cylinder.

6. A process according to claim 1, wherein said intermediate product has a hollow interior, and said pressurized fluid is one of air and a viscous edible filler.

7. A process according to claim 6, wherein said final product is a bubble gum, and said process further comprises the step of sugar coating said final product.

8. A process according to claim 1, wherein said confectionery product molded to a preselected shape has a plurality of molded areas and lines on its outer surface.

9. A process according to claim 8, wherein said confectionery product is a bubble gum product having a sugar coating.

10. A process according to claim 8, wherein said confectionery product has a hollow interior.

11. A process according to claim 2 further comprising bringing together said upper and lower mold parts while producing said final product and returning said lower mold part to said first position.

12. A process for manufacturing confectionery products, comprising the steps of:
   producing a plastically deformable intermediate product having an interior portion and a size smaller than a size of a final product;
   positioning said intermediate product within a mold having a preselected internal shape;
   connecting said interior portion of said intermediate product to a source of pressurized fluid;
   feeding said pressurized fluid into said interior portion to expand and urge said intermediate product against said mold, so that the resulted final product conforms said preselected internal shape of said mold and has the size greater than the size of said intermediate product; and
   disconnecting said final product from said source of pressurized fluid and extracting said final product from said mold.

13. The process of claim 12 wherein a plurality of molded areas and lines extend inwardly and outwardly from an exterior surface of said final product.

14. An apparatus for producing shaped confectionery products, comprising:
   a plurality of upper and lower mold parts having a preselected internal shape;
   positioning means for positioning intermediate products in said mold parts;
   fluid feeding means for feeding a pressurized fluid into an inner portion of each intermediate product to conform said intermediate product to said preselected internal shape of the upper and lower mold parts to produce said shaped products; and
   extractor means for removing said shaped products from said mold parts.

15. An apparatus according to claim 14, wherein said lower mold parts are movable between a first position where said positioning means is located and a second position where said upper mold parts are located, said upper mold parts being reciprocatable between open mold positions and closed mold positions in contact with said lower mold parts.

16. An apparatus according to claim 14 or 15, further comprising holding means for temporarily retaining said shaped products in said upper or lower mold parts.

17. An apparatus according to claim 16, wherein said extractor means, fluid feeding means and holding means are located on said upper mold parts.

18. An apparatus according to claim to 16, wherein said fluid feeding means comprises a hollow needle and a sharp edged collar projecting into each pair of upper and lower mold parts, and said extractor means comprises a plurality of blowing nozzles positioned substantially parallel to each needle.

19. Apparatus according to claim 14, wherein said lower mold parts are mounted on a chain conveyor.

20. Apparatus according to claim 19, wherein said lower mold parts are mounted on a rotating cylinder.

* * * * *

UNITED STATES PATENT AND TRADEMARK OFFICE
CERTIFICATE OF CORRECTION

PATENT NO. : 5,391,387
DATED : Feb. 21, 1995
INVENTOR(S) : Peters, Michael D.

It is certified that error appears in the above-identified patent and that said Letters Patent is hereby corrected as shown below:

Column 8, line 33, after "claim" cancel the word --to--.

Signed and Sealed this

Thirteenth Day of June, 1995

Attest:

BRUCE LEHMAN

*Attesting Officer*     *Commissioner of Patents and Trademarks*